US012439129B2

(12) United States Patent
Yelton

(10) Patent No.: US 12,439,129 B2
(45) Date of Patent: Oct. 7, 2025

(54) SYSTEMS AND METHODS FOR DETERMINING WHETHER TO ADJUST VOLUMES OF INDIVIDUAL AUDIO COMPONENTS IN A MEDIA ASSET BASED ON A TYPE OF A SEGMENT OF THE MEDIA ASSET

(71) Applicant: Adeia Guides Inc., San Jose, CA (US)

(72) Inventor: Alexis Yelton, Somerville, MA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/963,500

(22) Filed: Oct. 11, 2022

(65) Prior Publication Data

US 2023/0156290 A1 May 18, 2023

Related U.S. Application Data

(63) Continuation of application No. 16/644,039, filed as application No. PCT/US2017/051209 on Sep. 12, 2017, now Pat. No. 11,503,379.

(51) Int. Cl.
*G06F 17/00* (2019.01)
*G06F 3/16* (2006.01)
(Continued)

(52) U.S. Cl.
CPC ......... *H04N 21/4852* (2013.01); *G06F 3/165* (2013.01); *H04N 21/4394* (2013.01);
(Continued)

(58) Field of Classification Search
CPC .......................... G06F 3/165; H04N 21/4852; H04N 21/4394; H04N 21/4398; H04N 21/4532;
(Continued)

(56) References Cited

U.S. PATENT DOCUMENTS 6,239,794 B1   5/2001  Yuen et al.
6,359,661 B1 * 3/2002  Nickum ................. H04N 7/163
                                                       348/E7.061

(Continued)

FOREIGN PATENT DOCUMENTS

WO      2011087460 A1    7/2011

OTHER PUBLICATIONS

ID3 Draft Specification (2003) (41 pages).

*Primary Examiner* — Paul C Mccord
(74) *Attorney, Agent, or Firm* — HALEY GUILIANO LLP

(57) ABSTRACT

Systems and methods are provided herein for determining whether to adjust volumes of individual audio components in a media asset based on a type of segment of the media asset that is playing back. A media guidance application may determine that a user is playing back a segment of a media asset. The media guidance application may determine a type corresponding to the segment. The media guidance application may parse a plurality of audio components of the media asset that are playing back during the segment. The media guidance application may determine, for each audio component, whether to adjust the volume playing back during the segment based on the type. For each audio component of the plurality of audio components, in response to determining to adjust the volume, the media guidance application may adjust the volume of the audio component playing back during the segment.

20 Claims, 7 Drawing Sheets

(51) Int. Cl.
*H04N 21/439* (2011.01)
*H04N 21/45* (2011.01)
*H04N 21/485* (2011.01)
*H04N 21/845* (2011.01)

(52) U.S. Cl.
CPC ..... *H04N 21/4398* (2013.01); *H04N 21/4532* (2013.01); *H04N 21/8456* (2013.01)

(58) Field of Classification Search
CPC ........... H04N 21/8456; H04N 21/8106; H04N 21/45452; H04N 21/45457; H04N 21/84
USPC ............................................ 348/738; 700/94
See application file for complete search history.

(56) References Cited

U.S. PATENT DOCUMENTS

| | | | |
|---|---|---|---|
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 10,085,072 B2 * | 9/2018 | Shimy | H04N 21/812 |
| 2002/0174430 A1 | 11/2002 | Ellis et al. | |
| 2005/0251827 A1 | 11/2005 | Ellis et al. | |
| 2010/0017003 A1 * | 1/2010 | Oh | H04S 7/30 |
| | | | 700/94 |
| 2010/0153885 A1 | 6/2010 | Yates | |
| 2010/0322592 A1 | 12/2010 | Casagrande | |
| 2013/0294755 A1 | 11/2013 | Arme et al. | |
| 2013/0311575 A1 | 11/2013 | Woods et al. | |
| 2014/0240595 A1 * | 8/2014 | DiNunzio | H03G 3/04 |
| | | | 348/484 |
| 2015/0277850 A1 | 10/2015 | Wheatley | |
| 2016/0364397 A1 | 12/2016 | Lindner et al. | |
| 2017/0038700 A1 | 2/2017 | Takahashi et al. | |
| 2017/0155369 A1 * | 6/2017 | Wang | H03G 7/007 |
| 2017/0188106 A1 | 6/2017 | Harb | |

\* cited by examiner

SYSTEMS AND METHODS FOR DETERMINING WHETHER TO ADJUST VOLUMES OF INDIVIDUAL AUDIO COMPONENTS IN A MEDIA ASSET BASED ON A TYPE OF A SEGMENT OF THE MEDIA ASSET

CROSS-REFERENCE TO RELATED APPLICATION

This application is a continuation of U.S. patent application Ser. No. 16/644,039, filed Mar. 3, 2020, which is a national stage application under 35 U.S.C. § 371 of International Application PCT/US2017/051209, filed Sep. 12, 2017, which are herein incorporated by reference in their entireties.

BACKGROUND

Adjusting the volume of dialogue in relation to the background noise of a media asset in playback is a technique used to help viewers hear and understand dialogue from the media asset. The related art describes various ways of adjusting the volume of media content in playback. The related art isolates the audio signal into background noise and dialogue and uniformly adjusts the volume of the dialogue in relation to the background noise. The related art does not address adjusting the volume of individual audio components, including components beyond just the dialogue and background noise.

SUMMARY

Systems and methods are provided herein for determining whether to adjust volumes of individual audio components in a media asset based on a type of a segment of the media asset that is playing back. For example, if the user is watching an action scene in a movie, such as the movie Kill Bill, the volume of each audio component in the audio of the action scene may be individually adjusted based on volume settings specifically for action scenes.

To this end and others, in some aspects of the disclosure, a media guidance application may determine that a user is playing back a segment of a plurality of segments of a media asset. For example, the media guidance application may determine that the user is viewing a scene from the movie Kill Bill.

In response to determining that the user is playing back the segment, the media guidance application may retrieve metadata corresponding to the segment from a database. For example, the media guidance may retrieve metadata for the scene that the user is viewing from Kill Bill.

The media guidance application may determine, based on the metadata, a type corresponding to the segment. For example, the media guidance application may determine from the metadata for the scene (e.g., scene type metadata) that the scene the user is viewing in Kill Bill is an action scene.

The media guidance application may parse a plurality of audio components of the media asset that are playing back during the segment. For example, the media guidance application may parse (e.g., by using a neural network) audio from the action scene in Kill Bill that the viewer is currently watching.

The media guidance application may determine a respective category corresponding to each respective audio component of the plurality of audio components. For example, the media guidance application may determine that an audio component in the plurality of audio components from the action scene in Kill Bill corresponds to a sword-fighting category.

In some embodiments, when the media guidance application is determining a respective category corresponding to each respective audio component of the plurality of audio components, the media guidance application may retrieve, from a database, a data structure, where the data structure contains categories of audio components. For example, the media guidance may retrieve a data structure from the database that contains categories of audio components (e.g., gun shots, music, car noises, dialogue, sound effects, etc.).

The media guidance application may compare each respective audio component with an entry in a plurality of entries in the data structure. For example, the media guidance application may compare an audio component (e.g., sword fighting sounds) from the action scene the user in viewing in Kill Bill with an entry (e.g., fighting noises) in the plurality of entries in the data structure.

The media guidance application may determine, from the comparison, whether a match between a respective audio component and the entry in the data structure exists. For example, the media guidance application may determine, from comparing the audio component (e.g., the sword fighting sounds) with the entry (e.g., fighting noises) that a match exists.

In response to determining that the match exists, the media guidance application may determine, from the match, the respective category corresponding to the respective audio component. For example, the media guidance application may determine that category (e.g., fighting noises) corresponds to the audio component (e.g., the sword fighting sounds).

In some embodiments, when the media guidance application is determining a respective category corresponding to each respective audio component of the plurality of audio components, the media guidance application may determine, from the database, whether a respective category has subcategories. For example, the media guidance application may determine, from the database, that the fighting noises category has subcategories (e.g., such as gun shots, sword fights, punches, etc.).

In response to determining that the respective category has subcategories, the media guidance application may determine for each corresponding audio component, a respective subcategory. For example, the media guidance application may determine for each audio component from the action scene in Kill Bill (e.g., sword fighting sounds, punching sounds, etc. that fall into the fighting noises category), a respective subcategory (e.g., sword fights, punches, etc.).

The media guidance application may retrieve, from the database, for each respective category, volume parameters that correspond to the type corresponding to the segment. For example, the media guidance application may retrieve volume parameters for action categories (e.g., if the user is viewing the action scene from Kill Bill).

In some embodiments, when the media guidance application is retrieving, from the database, for each respective category, volume parameters that correspond to the type corresponding to the segment, the media guidance application may determine whether a plurality of users are viewing the media asset in a single physical viewing environment. For example, the media guidance application may retrieve, from the database, for each respective category (e.g., fighting noises, etc.), volume parameters that correspond to the type (e.g., action, suspense, thriller, comedy, romance, etc.). The media guidance application may determine (e.g., using a sensor) whether a plurality of users are viewing the media asset in a single physical viewing environment (e.g., multiple people viewing Kill Bill on the same television).

In response to determining that the plurality of users are viewing the media asset in the single physical viewing environment, the media guidance application may determine a preferred user of the plurality of users. For example, the media guidance application may determine a preferred user (e.g., the person that likes action movies the most) from the group of people watching Kill Bill together.

The media guidance application may retrieve, from the database, for each respective category, volume parameters for the preferred user that correspond to the type corresponding to the segment. For example, the media guidance application may retrieve, from the database, volume parameters for the preferred user (e.g., the user that likes action movies the most) that correspond to the type (e.g., action).

In some embodiments, when the media guidance application is determining the preferred user, the media guidance application may determine, from the database, profiles for each user in the plurality of users viewing the media asset. For example, the media guidance application may retrieve profiles, from the database, for each user watching Kill Bill together.

The media guidance application may retrieve, from the profiles, a rank corresponding to the type for each user in the plurality of users viewing the media asset. For example, the media guidance application may retrieve, from the profiles, a rank for each user watching Kill Bill together.

The media guidance application may determine a user in the plurality of users with the highest rank is the preferred user. For example, the media guidance application may determine the user with the highest rank (e.g., the user that likes action movies the most) is the preferred user.

The media guidance application may determine, for each respective category, whether the audio components corresponding to the respective category are set to a volume that is within the volume parameters. For example, the media guidance application may determine, for each respective category (e.g., fighting noises, etc.), whether the audio components corresponding to the respective category are set to a volume (e.g., set to 40 out of 100) that is within the volume parameters (e.g., 30-50 out of 100).

In response to determining that the audio components corresponding to the respective category are set to a volume that is within the volume parameters, the media guidance application may determine that there is not a need to adjust the volume of the audio components corresponding to the respective category. For example, the media guidance application may determine that the audio components corresponding to the fighting noises category are set to a volume (e.g., set to 45) that is within the volume parameters (e.g., 30-50 out of 100). The media guidance application may determine that there is not a need to adjust the volume of the audio components in the fighting noises category.

In response to determining that the audio components corresponding to the respective category are not set to a volume that is within the volume parameters, the media guidance application may determine a need to adjust the volume of the audio components corresponding to the respective category. For example, the media guidance application may determine that the audio components corresponding to the fighting noises category are set to a volume (e.g. set to 23) that is not within the volume parameters (e.g., 30-50 out of 100). The media guidance application may determine a need to adjust the volume of the audio components in the fighting noises category.

In some embodiments, when the media guidance application is determining, for each respective subcategory, whether to adjust a volume of audio components corresponding to the respective subcategory, the media guidance application may retrieve, from the database, for each respective subcategory, volume parameters that correspond to the type corresponding to the segment. For example, the media guidance application may retrieve, from the database, for each respective subcategory (e.g., sword fights, punches, etc.), volume parameters that correspond to the segment type (e.g., action scene).

The media guidance application may determine, for each respective subcategory, whether the audio components corresponding to the respective subcategory are set to a volume that is within the volume parameters. For example, the media guidance application may determine, from the sword fighting subcategory, whether the sword fighting audio component's volume (e.g., set to a volume of 25 out of 100) is set to a volume that is within the volume parameters (e.g., 30-35).

In response to determining a need to adjust the volume of audio components corresponding to the respective category, the media guidance application may adjust the volume of audio components corresponding to the respective category to a volume that is within the volume parameters. For example, the media guidance application may adjust the volume of audio components in the fighting noises category to a volume that is within the volume parameters (e.g., set the volumes to 45).

In some embodiments, when the media guidance application is adjusting the volume of audio components corresponding to the respective category to a volume that is within the volume parameters, the media guidance application may retrieve, from the database, a profile for the user.

The media guidance application may determine, from the profile, preferences for the user. For example, the media guidance application may determine, from the profile, preferences for the user (e.g., the user's preferred volume settings, etc.).

The media guidance application may determine, from the preferences for the user, volume parameter preferences based on the type. For example, the media guidance application may determine, from the user's preferences (e.g., the user's preferred volume settings), volume parameter preferences based on the type (e.g., volume parameter preferences based on action, comedy, romance, thriller, etc. segments).

The media guidance application may determine a volume within the volume parameters based the volume parameter preferences. For example, the media guidance application may determine a volume (e.g., 30 out of 100) within the volume parameters (e.g., 25-35 out of 100) based on the volume parameter preferences (e.g., the preferences may be select the volume to be the average of the volume parameter range).

In some embodiments, when the media guidance application is adjusting the volume of audio components corresponding to the respective category to a volume that is within the volume parameters, the media guidance application may retrieve, from the database, a profile for the user.

The media guidance application may determine, from the profile, preferences for the user. For example, the media guidance application may determine, from the profile, preferences for the user (e.g., the user's preferred volume settings, etc.).

The media guidance application may determine from the preferences for the user a threshold volume. For example, the media guidance application may determine from the preferences for the user a threshold volume (e.g., threshold volume for action movies is 35 out of 100).

The media guidance application may determine whether the volume that is within the volume parameters exceeds the threshold volume. For example, the media guidance application may determine that volume (e.g., set to 38 out of 100) that is within the volume parameters (e.g., 33-40 out of 100) exceeds the threshold volume (e.g. the threshold volume is 35 out of 100).

In response to determining that the volume that is within the volume parameters exceeds the threshold volume, the media guidance application may set the volume to be the threshold volume. For example, in response to determining that the volume (e.g., 38 out of 100) that is within the volume parameters (e.g., 33-40 out of 100) exceeds the threshold volume (e.g., 35), the media guidance application may set the volume to be the threshold volume (e.g., 35 out of 100).

In some embodiments, when the media guidance application is adjusting the volume of audio components corresponding to the respective category to a volume that is within the volume parameters, the media guidance application may receive a volume input from the user. For example, the media guidance application may receive a volume input from the user (e.g., the user selects a volume using a remote control).

The media guidance application may determine, from the volume input, a volume within the volume parameters. For example, the media guidance application may determine from the volume input (e.g., the user selects a volume using a remote control) a volume within the volume parameters (e.g., the user selects a volume of 50, when the volume parameters are 45-50 out of 100).

In some embodiments, the media guidance application may determine a user in the plurality of users, where the user in the plurality of users is not the preferred user. For example, the media guidance application may determine a user (e.g., a user who doesn't like action movies) in the plurality of users who is not the preferred user.

The media guidance application may adjust the volume of the audio components to the user in the plurality of users preferences. The media guidance application may adjust the volume of the audio components to the user (e.g., the user who doesn't like action movies) in the plurality of users preferences.

The media guidance application may play back the adjusted volume of audio components to a personal hearing device for the user in the plurality of users. For example, the media guidance application may play back the adjusted volume of audio components of the Kill Bill audio to a personal hearing device (e.g., wireless headphones) for the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
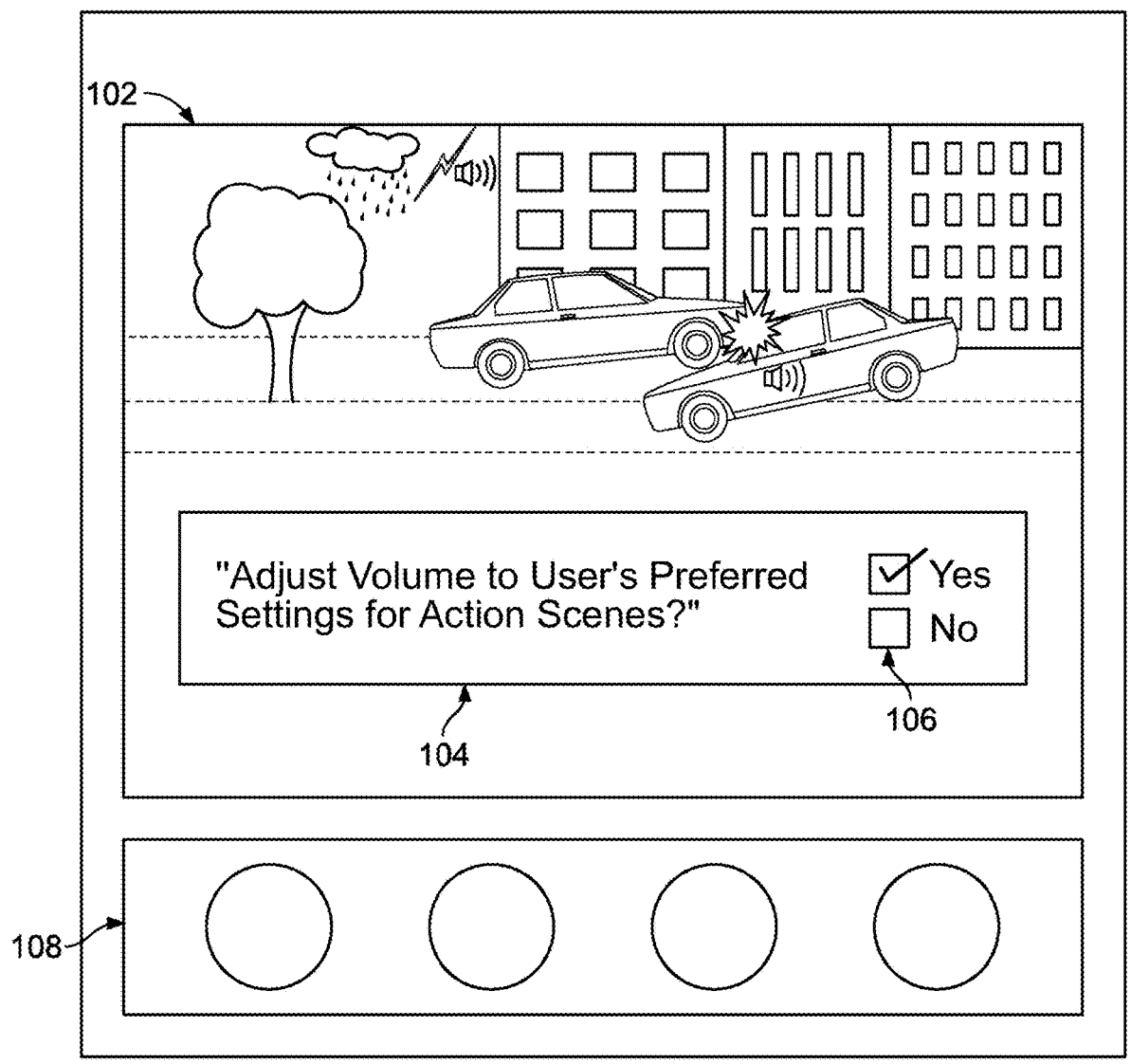
FIG. 1 depicts an illustrative embodiment of a display screen of user equipment that is playing back media content, in accordance with some embodiments of the disclosure.

FIG. 1 depicts an illustrative embodiment of a display screen of user equipment that is playing back media content, in accordance with some embodiments of the disclosure. FIG. 1 depicts an illustrative display 100, which may be generated for display by control circuitry that executes a media guidance application. The functionality of user equipment, control circuitry, and the media guidance application is described in further detail with respects to FIGS. 2-5.

The media guidance application may play back media asset 102 on user equipment 100, which may occur when a user requests to play back media asset 102. The media guidance application may generate prompt 104, which may request audio preference information from the user. For example, the media guidance application may generate prompt 104 as an overlay on media asset 102. The media guidance application may generate the overlay prompt 104 to contain the text "Adjust volume to user's preferred settings for action scenes?". The media guidance application may generate selectable options 106 that may be contained inside prompt 104. The media guidance application may determine, from user input (e.g., the user selecting a selectable option using a remote controller), the user's selection of selectable options 106. For example, the media guidance application may determine, from the user's selection, the user's preferred audio settings. The media guidance application may play back the user's preferred audio settings over sound bar 108. Sound bar 108 may be a part of speakers 414.

In some embodiments, a media guidance application may determine that a user is playing back a segment of a plurality of segments of a media asset. The media asset may determine that the user is playing back a segment of a plurality of segments to determine volume adjustments for audio components for that type of segments. As referred to herein, the term "segment" should be understood to mean a portion of the media asset that has a start time and an end time contained within the start time and the end time of the media asset. For example, a segment may be a five minute action scene in a 90 minute movie, or may be a thirty second clip of a plane crash sequence in a twenty minute television show (e.g., the television show LOST), etc. Also, as referred to herein, the term "audio components" should be understood to mean isolated audio signals, each of which corresponds to a unique sound (e.g., a gunshot sound, car crash sound, screaming sound, laughing sound, etc.). And also as referred to herein, the term "type" should be understood to mean a specific category (e.g., genre) corresponding to a segment of the media asset. For example, a type may be of the type action, romance, fighting, comedy, suspense, thriller, etc.

The media guidance application may determine the segment from the plurality of segments playing back by analyzing the boundaries contained in the media asset. As referred to herein, the term "boundary" should be understood to mean the transition point between two segments.

In some embodiments, the media guidance application may determine that the boundaries are predefined by an editor, and thus may retrieve the boundaries from the metadata for the media asset. The media guidance application may determine the segment from the plurality of segments playing back using the metadata of the media asset. The media guidance application may retrieve the current position of the media asset in playback from the guidance data. The media guidance application may retrieve metadata for the media asset from the guidance data corresponding to the current position of the media asset that the media guidance application is playing back. The media guidance data may determine, from the metadata, the segment containing the current position of the media asset that the media guidance application is playing back.

For example, the media guidance application may retrieve the current position (e.g., 50:02) of the media asset (e.g., Kill Bill) that the media guidance application is playing back. The media guidance application may retrieve metadata (e.g., scene:6 runtime:45:04-52:55) for Kill Bill from the guidance data corresponding to the current location of Kill Bill playing back. The media guidance application may determine, from the metadata, the segment (e.g., scene 6) that contains the current position (e.g., 50:02) of the media asset that the media guidance application is playing back.

In some embodiments, the media guidance application may determine that the boundary occurs between two segments that are of two distinctly different types, as described below.

In some embodiments, the media guidance application may determine the boundaries contained in the media asset from social media data. The media guidance application may retrieve social media data related to the media asset from an online network. The media guidance application may parse the social media data for data corresponding to the media asset. The media guidance application may determine from the parsed data (e.g., using keyword recognition) data indicative of a boundary between two segments (e.g., the tone of social media comments changing abruptly when referring to two subsequent portions of the media asset). The media guidance application may determine a segment in a plurality of segments from this identified boundary. Determining how to retrieve social media data and parse the data is described in greater detail in Woods et al. U.S. Publication No. US20130311575 A1, published Nov. 21, 2013, and Arme et al. U.S. Publication No. US20130294755 A1, issued Nov. 7, 2013, which are hereby incorporated by reference herein in their entireties. The media guidance application may determine that the segment identified from the boundary is the portion of the media asset from the identified boundary until the next subsequently identified boundary that represents the transition to another type.

For example the media guidance application may retrieve social media data related to the media asset (e.g., a comment thread about a portion of the movie Kill Bill on the video clip website, Youtube) from an online network (e.g., Youtube). The media guidance application may parse the social media data (e.g., the comment thread) for the data corresponding to the media asset (e.g., comments related to the movie Kill Bill). The media guidance application may determine, using keyword recognition (e.g., by using words related to Kill Bill such as action, fight, Beatrix Kiddo, Crazy 88, etc.) data indicative of a boundary between two segments (e.g., a comment at 1 min 51 sec "this scene in the sushi bar is hilarious" and a comment at 1 min 54 sec "that changed from sake to fighting quickly"). The media guidance application may determine a segment/segments (e.g., the portion of media before the boundary and/or the portion of media after the boundary) from the identified boundary (e.g., the time between 1 min 51 sec and 1 min 54 sec based on the comments).

As another example, the media guidance application may retrieve social media data related to the media asset (e.g., a data feed from the social media website Twitter, where the data set is identified by a hashtag (e.g, #killbillmarathononFX) that live Tweets a streaming of Kill Bill that is playing on a network television channel) from an online network (e.g., Twitter). The media guidance application may determine, using keyword recognition (e.g., by using words related to Kill Bill such as action, fight, Beatrix Kiddo, Crazy 88, etc.) data indicative of a boundary between two segments (e.g., a Tweet at 7:07 pm "bang bang #killbillmarathononFX" and a Tweet at 7:08 pm "the sheriff speaks so quietly! #killbillmarathononFX"). The media guidance application may determine a segment/segments (e.g., the portion of media before the boundary and/or the portion of media after the boundary) from the identified boundary (e.g., the time between 1:51 and 1:54 based on the comments).

In some embodiments, the media guidance application may determine that the boundary occurs between two segments that are of the same type, as described below.

In some embodiments, the media guidance application may determine from boundaries predefined by an editor that a boundary occurs between two segments are of the same type. For example, the media guidance application may determine that the boundaries are predefined by an editor, and thus may retrieve the boundaries from the metadata for the media asset. The media guidance application may determine the two segments are of the same type from the plurality of segments playing back using the metadata of the media asset. The media guidance application may retrieve the current boundary of the media asset in playback from the guidance data between the two segments of the same type.

In some embodiments, the media guidance application may determine sub-types contained within a type. The media guidance application may determine a boundary between two sub-type segments using similar methods as described above. As referred to herein, a "sub-type" is a segment category where at least two distinctly different types are combined (e.g., the sub-type "action-comedy," "romantic-comedy"). The media guidance application may determine that the sub-types are the treated in the same manner as two "same" types if the sub-types share at least one characteristics (e.g., action-comedy and action-thriller share the characteristic "action"). The media guidance application may determine that the sub-types are treated in the same manner as two "distinctly different types" if they do not share any characteristics (e.g., "action-comedy" and "foreign-romance" do not share any characteristics).

In response to determining that the user is playing back the segment, the media guidance application may retrieve metadata corresponding to the segment from a database. The media guidance application may retrieve metadata corresponding to the segment to determine the type corresponding to the segment. For example, the media guidance may retrieve metadata (e.g., scene type, length, characters, etc.) for the segment that the user is viewing from Kill Bill.

In some embodiments, the media guidance application may determine, based on the metadata, a type corresponding to the segment. The media guidance application may determine, from the metadata for the segment, the type of segment corresponding to the segment of the media asset in playback. For example, the media guidance application may retrieve the current position of the media asset (e.g., 1:15:23 of the Kill Bill movie) from the guidance data. The media guidance application may determine, from the metadata (e.g., scene 10 from 1:12:05-1:17:45, scene 10 type: action) that the type corresponding to the segment is action.

In some embodiments, the media guidance application may determine, based on crowd-sourced data, a type corresponding to the segment. As referred to herein, the term "crowd-sourced data" should be understood to mean any data where multiple users contribute to creating said data. The media guidance application may retrieve, from an online database, crowd-sourced data related to the segment of the media asset. The media guidance application may determine, from the crowd-sourced data, a type associated with the segment. For example, the media guidance application may retrieve crowd-sourced data (e.g., may retrieve social media data related to Kill Bill) from an online database. The media guidance application may determine, from the crowd-sourced data (e.g., a comment thread from a Youtube video containing the segment of Kill Bill), that the type associated with the segment is action (e.g., a comment on the Youtube video said "I love this action scene!").

As another example, the media guidance application may retrieve crowd-sourced data (e.g., may retrieve a Tweet from a Twitter thread associated with a live viewing of Kill Bill). The media guidance application may determine, based on the timestamp of the tweet (e.g., the user tweeted at 10:35 pm "Great fighting from Beatrix Kiddo to defeat the Crazy 88 in this action scene right now!"), and the start time of the user watching Kill Bill (e.g., based off the user tweeting at 9:00 pm "Starting Kill Bill Vol. 1 off with a BANG!"), that the user's tweet is within the segment, and thus the segment is of the type, action.

The media guidance application may parse a plurality of audio components of the media asset that are playing back during the segment. The media guidance application may parse the plurality of audio components of the media asset to isolate and adjust the volume of individual components, thus having more control over the volume adjustment, as described below. For example, the media guidance application may parse (e.g., by using a neural network) audio from the action scene in Kill Bill that the viewer is currently watching.

In some embodiments, the media guidance application may use a neural network to parse a plurality of audio components of the media asset that are playing back during the segment. The media guidance application may filter the audio signal from the media asset into a plurality of audio components (e.g., using audio signal processing, a frequency transform, etc.). The media guidance application may feed the plurality of audio components as inputs into a neural network. The media guidance application may feed the plurality of audio components as inputs into the neural network to act as training data. The media guidance application may input the inputs into a feedforward network, where each unit contained within the neural network weights the input as it progresses through the feedforward network. The addition of the weights of the unit determines what the neural network may label the different audio sources. The media guidance application may store the labeled audio sources as a data structure of audio components in the database.

For example, the media guidance application may parse a plurality of audio components of the media asset (e.g., action scene in Kill Bill). The media guidance application may feed the audio from the segment into a neural network, where the audio may be filtered into a plurality of audio components. The media guidance application may feed the plurality of audio components as inputs into a neural network, which may label the different audio sources (e.g., sword fighting, screaming, dialogue, background music, etc.). The media guidance application may store the labeled audio sources as a data structure of audio components in the database in the guidance data.

In some embodiments, the media guidance application may parse a plurality of audio components of the media asset that are playing back during the segment using editor-defined audio components. The media guidance application may retrieve audio component metadata for the media asset. The media guidance application may determine, from the audio component metadata, a plurality of editor-defined audio components, each of which is assigned to a different audio channel. For example, the media guidance application may determine, from the metadata for the media asset (e.g., Kill Bill), a plurality of editor-defined audio components, each of which is assigned to a different audio channel.

In some embodiments, as a result of parsing the audio components of the media asset, the media guidance application may generate isolated audio components, each of which corresponds to a specific type of sound. The media guidance application parses the audio components to be able to sort the audio components into specific types of sounds, allowing the media guidance application to use finer control mechanisms to adjust the volumes of each audio component.

The media guidance application may determine a respective category corresponding to each respective audio component of the plurality of audio components. The media guidance application may determine the respective category corresponding to each respective audio component to be able to adjust the volumes of specific categories of components. The media guidance application may determine a respective category corresponding to each respective audio component as described below. For example, the media guidance application may determine that an audio component in the plurality of audio components from the action scene in Kill Bill corresponds to a sword-fighting category.

In some embodiments, when the media guidance application is determining a respective category corresponding to each respective audio component of the plurality of audio components, the media guidance application may retrieve, from a database, a data structure, where the data structure contains categories of audio components. The data structure may contain predefined categories of audio components that an editor has defined. The media guidance application may store the database in the guidance data. For example, the media guidance may retrieve a data structure from a database in the guidance data that contains categories of audio components (e.g., gun shots, music, car noises, dialogue, sound effects, etc.).

The media guidance application may compare each respective audio component with an entry in a plurality of entries in the data structure. The media guidance application may compare each respective audio component with an entry in the plurality of entries in the data structure to determine what category of audio components each respective audio component is contained within. The media guidance application may retrieve the entry in the data structure from the guidance data. For example, the media guidance application may compare an audio component (e.g., sword fighting sounds) from the action segment the user in viewing in Kill Bill with an entry (e.g., fighting noises) in the plurality of entries, retrieved from the data structure in the guidance data.

The media guidance application may determine, from the comparison, whether a match between a respective audio component and the entry in the data structure exists. As described herein, the media guidance application determines that there is a "match" when the audio component exceeds a threshold percentage of similarity when compared to the entry in the data structure.

In some embodiments, the media guidance application may determine that the entries contain characteristics (e.g., signal and sound characteristics) for each category. The media guidance application may retrieve, from the guidance data, a default threshold percentage of similarity, where the default threshold value is determined by an audio expert, and uploaded to the guidance data. As described herein, the media guidance application determines that the "threshold percentage of similarity" is the percentage of similarity needed between characteristics of the audio component and the entry in the data structure to be considered a match, where similarity refers to audio components having the same characteristics (e.g., pitch, quality, loudness, length, etc.).

The media guidance application may compare the characteristics of the audio component with the characteristics of the entry to determine whether a match exists. For example, the media guidance application may determine, from comparing the audio component's (e.g., the sword fighting sounds) characteristics (e.g., pitch, quality, loudness, length, etc.) with the entry's (e.g., fighting noises) characteristics (e.g., pitch, quality, loudness, length, etc.) that a match exists, because the sword fighting sound's characteristics and the fighting noises category's characteristics share more than a threshold percentage of similarity (e.g., they are 80% similar, when the threshold may be 75%).

In response to determining that the match exists, the media guidance application may determine, from the match, the respective category corresponding to the respective audio component. The media guidance application may determine from the information in the entry the respective category corresponding to the matched entry, and thus the respective audio component. For example, the media guidance application may determine the category (e.g., fighting noises), from the information in the matched entry (e.g., category: fighting noises), that corresponds to the audio component (e.g., the sword fighting sounds).

In some embodiments, when the media guidance application is determining a respective category corresponding to each respective audio component of the plurality of audio components, the media guidance application may determine, from the database, whether a respective category has subcategories. The media guidance application may determine whether a respective category corresponding to each respective audio component of the plurality of audio components has subcategories to help further classify audio components to allow for further finer control mechanisms to control the volumes of individual components, and further defines and allows for finer detection of the boundaries between segments because of the increased amount of data available from the subcategories (e.g., allows for finer second by second detection in changes in sound types).

In some embodiments, the media guidance application may determine, based on crowd-sourced data, subcategories of audio components. The media guidance application may retrieve, from an online database, crowd-sourced data related to the audio component category. The media guidance application may determine, from the crowd-sourced data, if any subcategories exist for that audio category. For example, the media guidance application may retrieve crowd-sourced data (e.g., may retrieve audio categories labeled by users) from an online database. The media guidance application may determine, from the crowd-sourced data, that there are subcategories corresponding to the audio category (e.g., there are indicators in the online database indicating a family of audio categories organized in a hierarchical structure, where the subcategories of an audio category are linked below the category).

The media guidance application may retrieve, from the information in the entry, the subcategories for the respective category. The information may contain pointers corresponding to subcategories, of which each pointer points to the location of a corresponding subcategory. For example, the media guidance application may retrieve, from the information in the entry, subcategories (e.g., such as gun shots, sword fights, punches, etc.) for the respective category (e.g., fighting noises). The media guidance application may determine, from the information, pointers to the location of the subcategory entries for the respective category (e.g., fighting noises).

In response to determining that the respective category has subcategories, the media guidance application may determine for each corresponding audio component a respective subcategory. The media guidance application may determine the respective subcategory in a similar manner as described above with regard to determining a respective category. For example, the media guidance application may determine for each audio component from the action scene in Kill Bill (e.g., sword fighting sounds, punching sounds, etc. that fall into the fighting noises category), a respective subcategory (e.g., sword fights, punches, etc.).

In some embodiments, after determining the corresponding categories and/or subcategories for an audio components, the media guidance application may determine volume parameters, for each respective category, corresponding to the type of the segment. The media guidance application may use the volume parameters to adjust the volumes of the audio components based on the type of segment currently in playback.

The media guidance application may retrieve, from the database, for each respective category, volume parameters that correspond to the type corresponding to the segment. The media guidance application may determine that the volume parameters are default values, or user-specific values.

In some embodiments, the media guidance application may retrieve default volume parameters from the database in the guidance data. The default volume parameters may be defined by an editor. For example, the media guidance application may retrieve default volume parameters from the guidance data corresponding to the action type for the action segment in Kill Bill that the user is viewing.

In some embodiments, the media guidance application may retrieve user-specific volume parameters from the database in the user profile. The user-specific volume parameters may be default volume parameters (e.g., editor defined) adjusted based on input from the user. For example, the media guidance application may retrieve user-adjusted volume parameters from the user profile corresponding to the action type for the action segment in Kill Bill that the user is viewing.

In some embodiments, when the media guidance application is retrieving, from the database, for each respective category, volume parameters that correspond to the type corresponding to the segment, the media guidance application may determine whether a plurality of users are viewing the media asset in a single physical viewing environment. The media guidance application may determine whether a plurality of users are viewing the media asset in a single physical viewing environment in order to determine which user's volume parameters to use to adjust the volumes of the audio components. For example, the media guidance application may retrieve, from the database, for each respective category (e.g., fighting noises, etc.), volume parameters that correspond to the type (e.g., action, suspense, thriller, comedy, romance, etc.). The media guidance application may determine (e.g., using a sensor) whether a plurality of users are viewing the media asset in a single physical viewing environment (e.g., multiple people viewing Kill Bill on the same television).

In some embodiments, the media guidance application may determine whether a plurality of users are viewing the media asset in a single physical viewing environment by using a sensor. For example, the media guidance application may use a camera (e.g., a sensor) to determine whether a plurality of users are viewing the media asset in a single location. The media guidance application may determine, using facial recognition on video frames from the camera, whether multiple users are present in the video frames. In response to determining that multiple users are present in the video frames, the media guidance application may determine that a plurality of users are viewing the media asset in a single viewing environment (e.g., a group of users watching Kill Bill around the same television). Determining whether a plurality of users are viewing a media asset in a single physical viewing environments is described in greater detail in Blake et al. U.S. Application No. US2017/038700, filed Jul. 22, 2017, which is hereby incorporated by reference herein in its entirety.

In response to determining that the plurality of users are viewing the media asset in the single physical viewing environment, the media guidance application may determine a preferred user of the plurality of users. The media guidance application may determine a preferred user of the plurality of users in order to use the preferred user's volume parameters to adjust the volume of audio components in the media asset. The media guidance application may determine a preferred user from the plurality of users as described in detail below. For example, the media guidance application may determine a preferred user (e.g., the person that likes action movies the most) from the group of people watching Kill Bill together.

In some embodiments, when the media guidance application is determining the preferred user, the media guidance application may determine, from the database, profiles for each user in the plurality of users viewing the media asset. The media guidance application may retrieve profiles for each user from the guidance data. The media guidance application may retrieve the profiles for each user to factor in the determination of which user is the preferred user. For example, the media guidance application may retrieve profiles, from the database, for each user watching Kill Bill together.

The media guidance application may retrieve, from the profiles, a rank corresponding to the type for each user in the plurality of users viewing the media asset. The media guidance application may retrieve, from a ranking database stored in the user profile, an entry corresponding to a type in the ranking database. The media guidance application may determine from the entry, the rank of the user corresponding to that type of segment. For example, the media guidance application may retrieve, from entries in the ranking database from the profiles, a rank for each user watching Kill Bill together (e.g., may retrieve a rank corresponding to the segment type: action).

In some embodiments, the media guidance application may determine the rank corresponding to the type for each user based on the content the user consumes. The media guidance application may determine that the rank corresponds to the percentage of content that the user consumes corresponding to that type. The media guidance application may determine the type of content consumed by the user by retrieving the user's viewing history data from the guidance data, as well as the corresponding metadata (e.g., the genre/type metadata) for the viewing history data.

In some embodiments, the media guidance application may determine the type of content consumed by the user based on crowd sourced data, as described above.

The media guidance application may determine the percentage of content that the user consumes corresponding to that type by dividing the time the user spent viewing media content of that type by the total amount of time the user has spent viewing media content. For example, if, out of the total content consumed by the user, 85% of the content consumed is of the type action, then the user's action-type rank is 85%.

The media guidance application may determine a user in the plurality of users with the highest rank is the preferred user. For example, the media guidance application may determine the user with the highest rank (e.g., the user that consumes action movies the most) is the preferred user.

The media guidance application may retrieve, from the database, for each respective category, volume parameters for the preferred user that correspond to the type corresponding to the segment. The media guidance application may retrieve the volume parameters for the preferred user to adjust the volume of the media asset to the preferred user's preferences. The media guidance application may retrieve an entry from the database that corresponds to the volume parameters based on the type corresponding to the segment. For example, the media guidance application may retrieve, from an entry in the database, volume parameters for the preferred user (e.g., the user that watches action movies the most) that correspond to the type (e.g., action).

The media guidance application may determine, for each respective category, whether the audio components corresponding to the respective category are set to a volume that is within the volume parameters. The media guidance application may compare the current volume of the audio component with the volume parameters to determine if the volume is within the parameters. For example, the media guidance application may determine, for each respective category (e.g., fighting noises, etc.), whether the audio components corresponding to the respective category are set to a volume (e.g., set to 40 out of 100) that is within the volume parameters (e.g., 30-50 out of 100). In this example the volume scale was set out of one hundred, but any type of scale or measuring system may be used when determining the volume and the volume parameters.

In response to determining that the audio components corresponding to the respective category are set to a volume that is within the volume parameters, the media guidance application may determine that there is not a need to adjust the volume of the audio components corresponding to the respective category. For example, the media guidance application may determine that the audio components corresponding to the fighting noises category are set to a volume (e.g., set to 45) that is within the volume parameters (e.g., 30-50 out of 100). The media guidance application may determine that there is not a need to adjust the volume of the audio components in the fighting noises category.

In response to determining that the audio components corresponding to the respective category are not set to a volume that is within the volume parameters, the media guidance application may determine a need to adjust the volume of the audio components corresponding to the respective category. For example, the media guidance application may determine that the audio components corresponding to the fighting noises category are set to a volume (e.g. set to 23) that is not within the volume parameters (e.g., 30-50 out of 100). The media guidance application may determine a need to adjust the volume of the audio components in the fighting noises category.

Along with determining whether the volumes of audio components in categories need to be adjusted, the media guidance application may use similar methods to determine whether the volumes of audio components in subcategories need to be adjusted, as described in detail below. The media guidance application may adjust the volumes of audio components in subcategories to allow for finer control over the volume adjustment, creating a more personalized audio output for the user.

In some embodiments, when the media guidance application is determining, for each respective subcategory, whether to adjust a volume of audio components corresponding to the respective subcategory, the media guidance application may retrieve, from the database, for each respective subcategory, volume parameters that correspond to the type corresponding to the segment. The media guidance application may retrieve the volume parameters from an entry in the database corresponding to each respective subcategory. For example, the media guidance application may retrieve, from an entry the database, for each respective subcategory (e.g., sword fights, punches, etc.), volume parameters that correspond to the segment type (e.g., action scene).

The media guidance application may determine, for each respective subcategory, whether the audio components corresponding to the respective subcategory are set to a volume that is within the volume parameters. The media guidance application may compare the current volume of the audio component with the respective volume parameters. For example, the media guidance application may determine, from the sword fighting subcategory, whether the sword fighting audio component's volume (e.g., set to a volume of 25 out of 100) is set to a volume that is within the volume parameters (e.g., 30-35). The media guidance application may compare the audio component's volume to the subcategory volume parameters to determine that the volume is within the parameters.

In response to determining a need to adjust the volume of audio components corresponding to the respective category, the media guidance application may adjust the volume of audio components corresponding to the respective category to a volume that is within the volume parameters. For example, the media guidance application may adjust the volume of audio components in the fighting noises category to a volume that is within the volume parameters (e.g., set the volumes to 45). The media guidance application may determine the specific volume within the parameters to adjust the audio component to based on the methods described in detail below.

In some embodiments, when the media guidance application is adjusting the volume of audio components corresponding to the respective category to a volume that is within the volume parameters, the media guidance application may retrieve, from the database, a profile for the user. For example, the media guidance application may retrieve a profile for the user (e.g., may be the preferred user's profile) from the guidance data. The media guidance application may retrieve a profile for the user to determine preferences for the user, which may help further refine the volume adjustments.

The media guidance application may determine, from the profile, preferences for the user. For example, the media guidance application may determine, from the profile, preferences for the user (e.g., the user's preferred volume settings, preferred volume settings base on type, etc.).

The media guidance application may determine, from the preferences for the user, volume parameter preferences based on the type. The media guidance application may determine the exact volume to set an audio component to within the volume parameter range using the user's volume parameter preferences based on the type. The media guidance application may retrieve the volume parameters from the user's volume settings preferences. For example, the media guidance application may determine, from the user's preferences (e.g., the user's preferred volume settings), volume parameter preferences based on the type (e.g., volume parameter preferences based on action, comedy, romance, thriller, etc. segments).

The media guidance application may determine a volume within the volume parameters based the volume parameter preferences. The media guidance application may determine the volume within the volume parameters to be an average of the volume parameter range, or may determine that the volume within the volume parameters to be dependent on a user threshold volume, or may determine the volume within the volume parameters based on user input, as described in detail below.

In some embodiments, the media guidance application may determine that the volume within the volume parameters is an average of the volume parameter range. The media guidance application may take the average of the volume parameters by adding the maximum and minimum values of the parameter, and then dividing the result of the summation by two. For example, the media guidance application may determine a volume (e.g., 30 out of 100) within the volume parameters (e.g., 25-35 out of 100) based on the volume parameter preferences (e.g., the preferences may be select the volume to be the average of the volume parameter range).

In some embodiments, the media guidance application may determine that the volume within the volume parameters to be dependent on a user threshold volume. When the media guidance application is adjusting the volume of audio components corresponding to the respective category to a volume that is within the volume parameters, the media guidance application may retrieve, from the database, a profile for the user. For example, the media guidance application may retrieve a user profile from the guidance data.

The media guidance application may determine, from the profile, preferences for the user. For example, the media guidance application may determine, from the profile, preferences for the user (e.g., the user's preferred volume settings, etc.).

The media guidance application may determine from the preferences for the user a threshold volume. The threshold volume in the preferences for the user may be a default value based on type from the guidance data, which may be adjusted based on user input. The media guidance application may determine that the threshold volume is within the volume parameters. For example, the media guidance application may determine from the preferences for the user a threshold volume based on segment type (e.g., threshold volume for action movies is 35 out of 100).

The media guidance application may determine whether the volume that is within the volume parameters exceeds the threshold volume. The media guidance application may compare the volume with the threshold volume to determine if the volume exceeds the threshold volume. For example, the media guidance application may determine that volume (e.g., set to 38 out of 100) that is within the volume parameters (e.g., 33-40 out of 100) exceeds the threshold volume (e.g. the threshold volume is 35 out of 100).

In response to determining that the volume that is within the volume parameters exceeds the threshold volume, the media guidance application may set the volume to be the threshold volume. For example, in response to determining that the volume (e.g., 38 out of 100) that is within the volume parameters (e.g., 33-40 out of 100) exceeds the threshold volume (e.g., 35), the media guidance application may set the volume to be the threshold volume (e.g., 35 out of 100).

In some embodiments, when the media guidance application is adjusting the volume of audio components corresponding to the respective category to a volume that is within the volume parameters, the media guidance application may receive a volume input from the user. The media guidance application may receive volume input from the user via a remote control, or any other mechanism used by the user to input a volume. For example, the media guidance application may generate prompt 104 to be displayed over media asset 102. The media guidance application may determine generate selectable options 106 that may include volume choices within the volume parameters for the user. The media guidance application may determine a volume input based on the user's volume selection (e.g., via a remote controller) from selectable options 106. As another example, the media guidance application may receive a volume input from the user from volume input buttons on a remote control.

The media guidance application may determine, from the volume input, a volume within the volume parameters. For example, the media guidance application may determine from the volume input (e.g., the user selects a volume using a remote control) a volume within the volume parameters (e.g., the user selects a volume of 50, when the volume parameters are 45-50 out of 100).

In some embodiments, when the media guidance application receives a volume input from the user that is outside of the volume parameters (e.g., the user selects a volume of 55 when the volume parameters are 45-50), the media guidance application may determine that the adjusted volume is the closet volume to the user input that is within range of the volume parameters (e.g., the adjusted volume would be 50).

The media guidance application may play the audio components with adjusted volumes during play back of media asset 102 through sound bar 108. For example, the media guidance application may play back the adjusted action audio components in the action scene in Kill Bill through sound bar 108.

In some embodiments, when a plurality of users are viewing the media asset in a single location, and the volume preferences are retrieved from the preferred user's profile, the media guidance application may playback adjusted audio components corresponding to non-preferred user's volume preferences on personal hearing devices, to ensure that multiple users hear the media asset with each user's preferred volume preferences.

In some embodiments, the media guidance application may determine a user in the plurality of users, where the user in the plurality of users is not the preferred user. For example, the media guidance application may determine a user (e.g., a user who doesn't like action movies) in the plurality of users who is not the preferred user.

The media guidance application may adjust the volume of the audio components to the user in the plurality of users preferences. The media guidance application may adjust the volume of the audio components to the user in the plurality of users' preferences using the same methods as described above. For example, the media guidance application may adjust the volume of the audio components to the user (e.g., the user who doesn't like action movies) in the plurality of users' preferences.

The media guidance application may play back the adjusted volume of audio components to a personal hearing device for the user in the plurality of users. For example, the media guidance application may play back the adjusted volume of audio components of the Kill Bill audio to a personal hearing device (e.g., wireless headphones) for the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
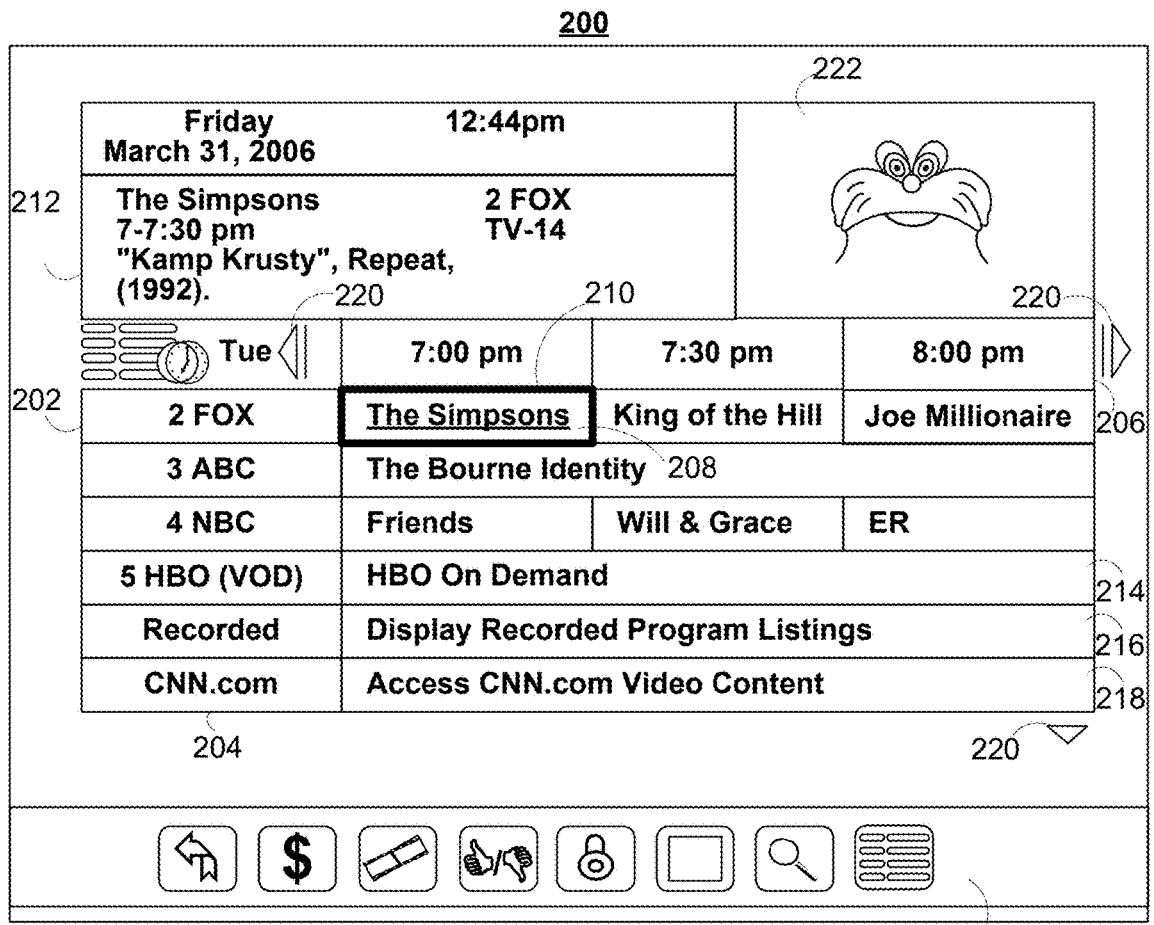
FIG. 2 shows an illustrative embodiment of a display screen that may be used to provide media guidance application listings and other media guidance information, in accordance with some embodiments of the disclosure.
Figure 3:
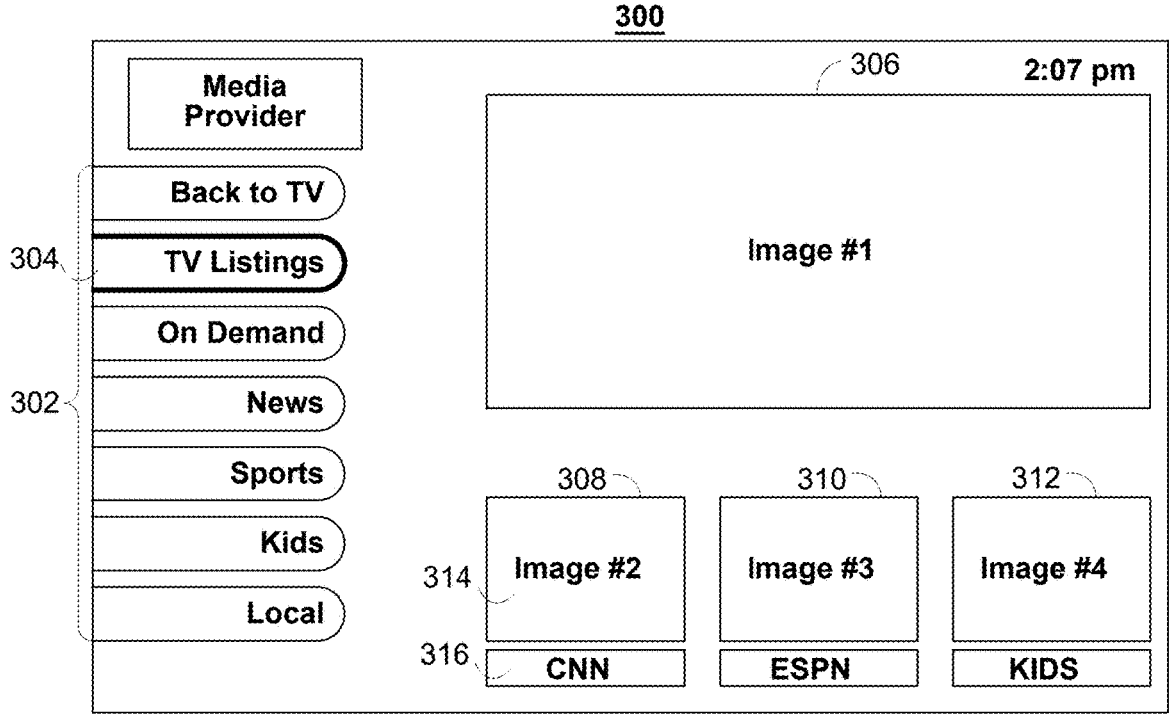
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
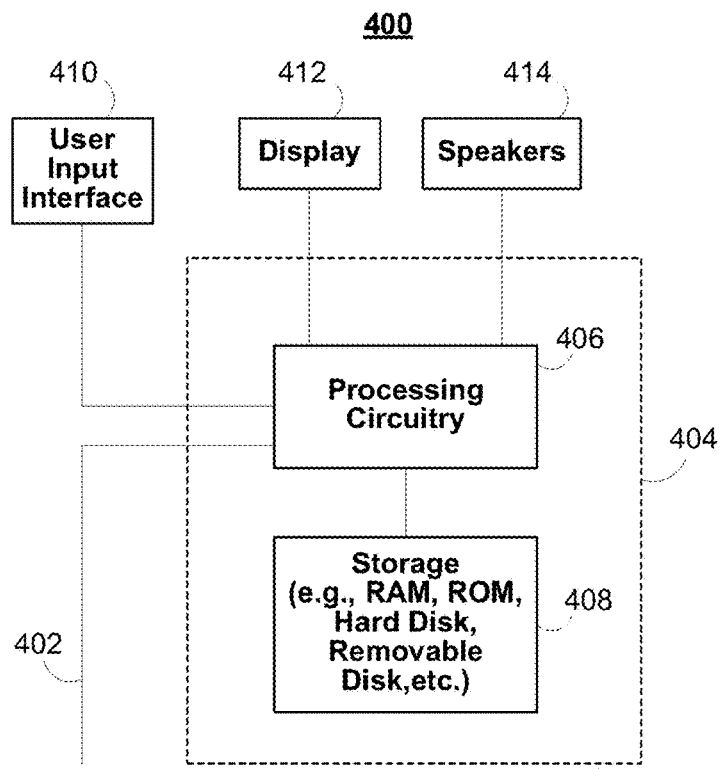
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
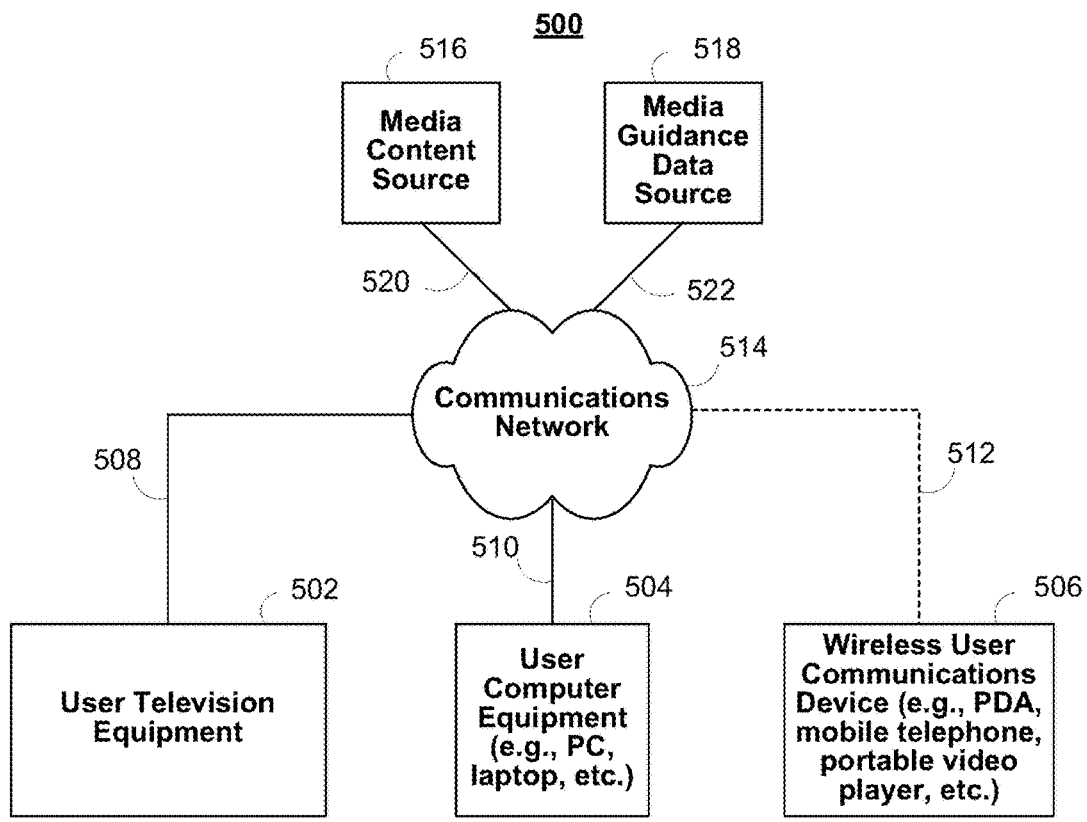
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
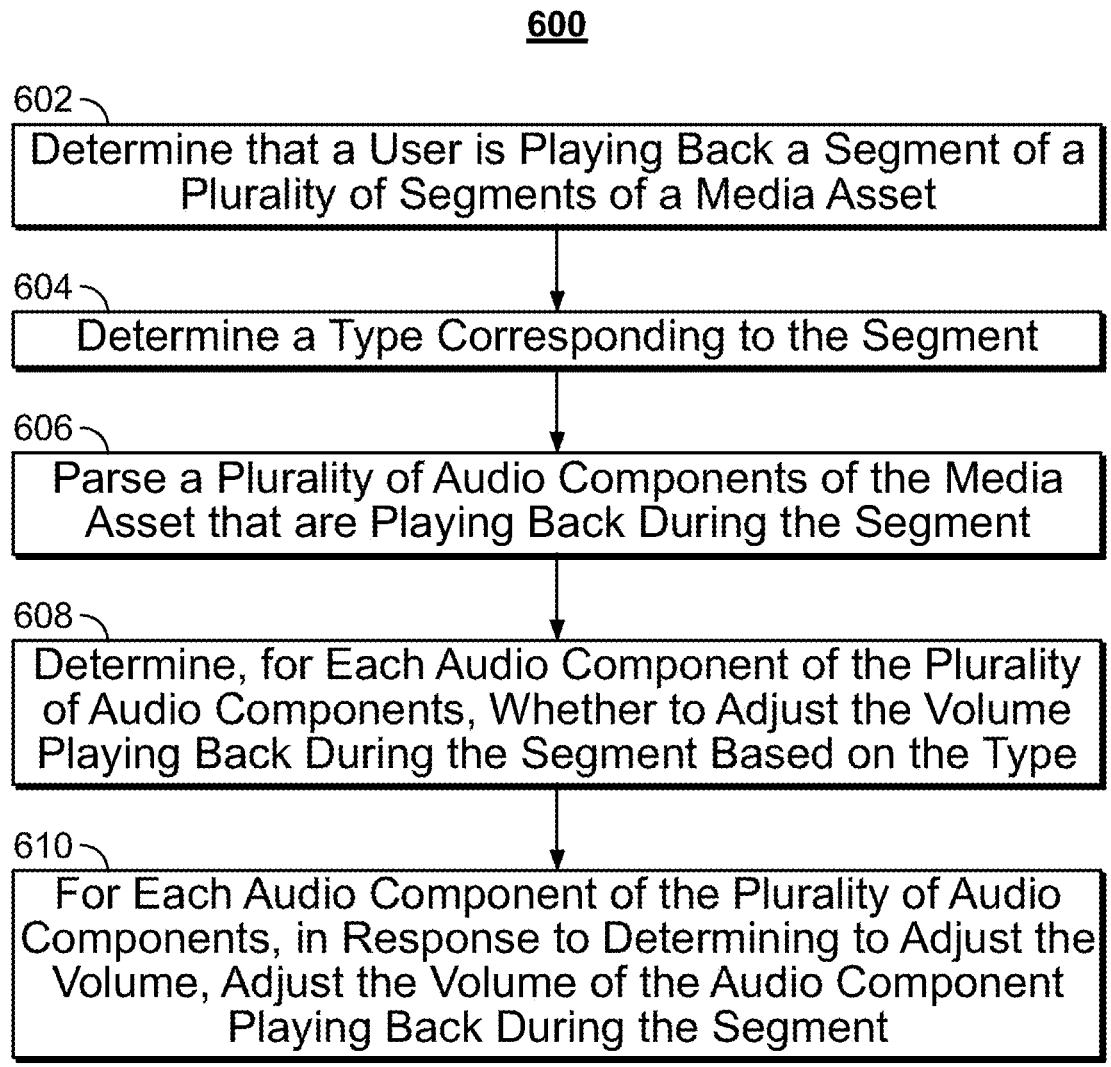
FIG. 6 depicts an illustrative flowchart of a process for determining whether to adjust volumes of individual audio components in a media asset based on a type of a segment of the media asset that is playing back, in accordance with some embodiments of the disclosure.

FIG. 6 depicts an illustrative flowchart of a process for determining whether to adjust volumes of individual audio components in a media asset based on a type of a segment of the media asset that is playing back, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514, or distributed over a combination of both.

Process 600 begins at 602, where control circuitry 404 determines that a user is playing back a segment of a plurality of segments of a media asset (e.g., on user equipment 100 or on user computer equipment 504 by way of display 412). Control circuitry 404 determines that the segment of the media asset is playing back from metadata for the media asset retrieved from media guidance data source 518 over communications network 514. Control circuitry may retrieve the media asset from media content source 516 over communications network 514. For example, control circuitry 404 may determine that a segment of the Kill Bill movie is playing back from the metadata for the Kill Bill movie retrieved from media guidance data source 518 over communications network 514. At 604, control circuitry 404 determines a type corresponding to the segment. Control circuitry 404 retrieves the type from metadata for the media asset from guidance data source 518 over communications network 514. At 606, control circuitry 404 parses a plurality of audio components of the media asset that are playing back during the segment. Control circuitry 404 parses the plurality of audio components using the methods described above. For example, control circuitry 404 may parse the plurality of audio components in a neural network using processing circuitry 406.

At 608, control circuitry 404 determines, for each audio component of the plurality of audio components, whether to adjust the volume playing back during the segment based on the type. Control circuitry retrieves information from media guidance data source 518 over communications network 514 to determine whether to adjust the volume playing back during the segment based on type. Control circuitry 404 compares the volume of each audio component to a corresponding volume parameter entry in the information from media guidance source 518. Based on determining volumes of audio components that are not contained in the corresponding volume parameters, control circuitry 404 determines to adjust the volumes.

At 610, for each audio component of the plurality of audio components, in response to determining to adjust the volume, control circuitry 404 adjusts the volume of the audio component playing back during the segment. Control circuitry 404 processes the adjusted volume with processing circuitry 406 and plays the adjusted volumes through speaker 414 while the media asset is output on display 412.

Figure 7:
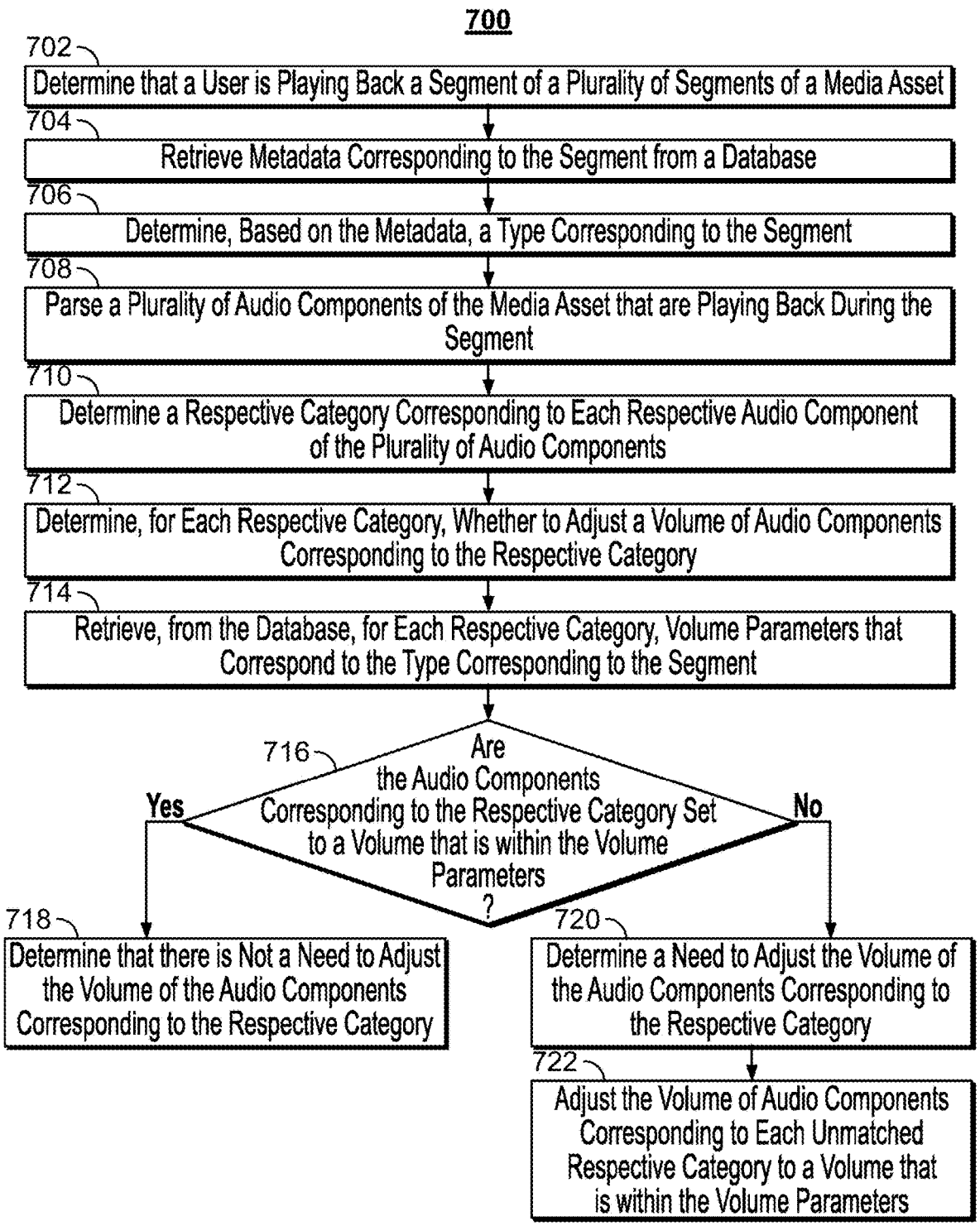
FIG. 7 depicts an illustrative flowchart of a process for determining whether to adjust volumes of individual audio components in a media asset based on a type of a segment of the media asset that is playing back, in accordance with some embodiments of the disclosure.

FIG. 7 depicts an illustrative flowchart of a process for determining whether to adjust volumes of individual audio components in a media asset based on a type of a segment of the media asset that is playing back, in accordance with some embodiments of the disclosure. Process 700 begins at 702, where control circuitry 404 determines that a user is playing back a segment of a plurality of segments of a media asset. Control circuitry 404 determines that the segment of the media asset is playing back from metadata for the media asset retrieved from media guidance data source 518 over communications network 514. Control circuitry may retrieve the media asset from media content source 516 over communications network 514. At 704, control circuitry 404 retrieves metadata corresponding to the segment from a database. Control circuitry 404 retrieves metadata corresponding to the segment from media guidance data source 518 over communications network 514. For example, the media guidance application may retrieve metadata corresponding to the segment (e.g., an action scene from Kill Bill) from media guidance data source 518 over communications network 514. At 706, control circuitry 404 determines, based on the metadata, a type corresponding to the segment. For example, control circuitry 404 may determine the type from the metadata (e.g., type:action).

At 708, control circuitry 404 parses a plurality of audio components of the media asset that are playing back during the segment. Control circuitry 404 parses the plurality of audio components using the methods described above. For example, control circuitry 404 may parse the plurality of audio components in a neural network using processing circuitry 406. At 710, control circuitry 404 determines a respective category corresponding to each respective audio component of the plurality of audio components.

At 712, control circuitry 404 determines, for each respective category, whether to adjust a volume of audio components corresponding to the respective category. Control circuitry 404 determines whether to adjust the volume of audio components corresponding to the respective category using the methods described above. For example, control circuitry 404 may determine whether to adjust the volume of audio components based on volume parameters retrieved from the information from media guidance data source 518 over communications network 514. At 714, control circuitry 404 retrieves, from the database, for each respective category, volume parameters that correspond to the type corresponding to the segment. Control circuitry 404 retrieves volume parameters from a volume parameter database in media guidance data source 518 over communications network 514. For example, control circuitry 404 may retrieve, from media guidance data source 518 over communications network 514, volume parameters corresponding to a type (e.g., the type may be action).

At 716, control circuitry 404 determines, for each respective category, whether the audio components corresponding to the respective category are set to a volume that is within the volume parameters. Control circuitry 404 compares the set volume of the audio components corresponding to the respective category with the volume parameters using processing circuitry 406. Control circuitry determines, from the comparison, whether the volume is within the volume parameters. For example, control circuitry 404 compares the set volume of the audio components corresponding to the respective category (e.g., fighting noise in the action type segment) with the volume parameters (e.g., volume parameters retrieved from media guidance data source 518 over communications network 514 for an action type segment). Control circuitry 404 determines, from the comparison, whether the volume is within the volume parameters (e.g., for the action type segment).

If, at 716, control circuitry 404 determines that "Yes," the audio components corresponding to the respective category are set to a volume that is within the volume parameters, then process 716 proceeds to 718. At 718, control circuitry 404 determines that there is not a need to adjust the volume of the audio components corresponding to the respective category. Control circuitry 404 does not change the volume for the audio components being played out from speakers 414. For example, control circuitry 404 may determine that that there is not a need to adjust the volume of the audio components corresponding to the respective category, and may not change the volume settings for the audio being played back from speakers 414.

If, at 716, control circuitry 404 determines that "No," the audio components corresponding to the respective category are not set to a volume that is within the volume parameters, then process 716 proceeds to 720. At 720, control circuitry 404 determines a need to adjust the volume of the audio components corresponding to the respective category. At 722, control circuitry 404 adjusts the volume of audio components corresponding to each unmatched respective category to a volume that is within the volume parameters. Control circuitry 404 adjusts the volume of audio components corresponding to each unmatched respective category to a volume that is within the volume parameters using the methods described above. Control circuitry 404 adjusts the volume of audio components being played out of speakers 414.

Figure 8:
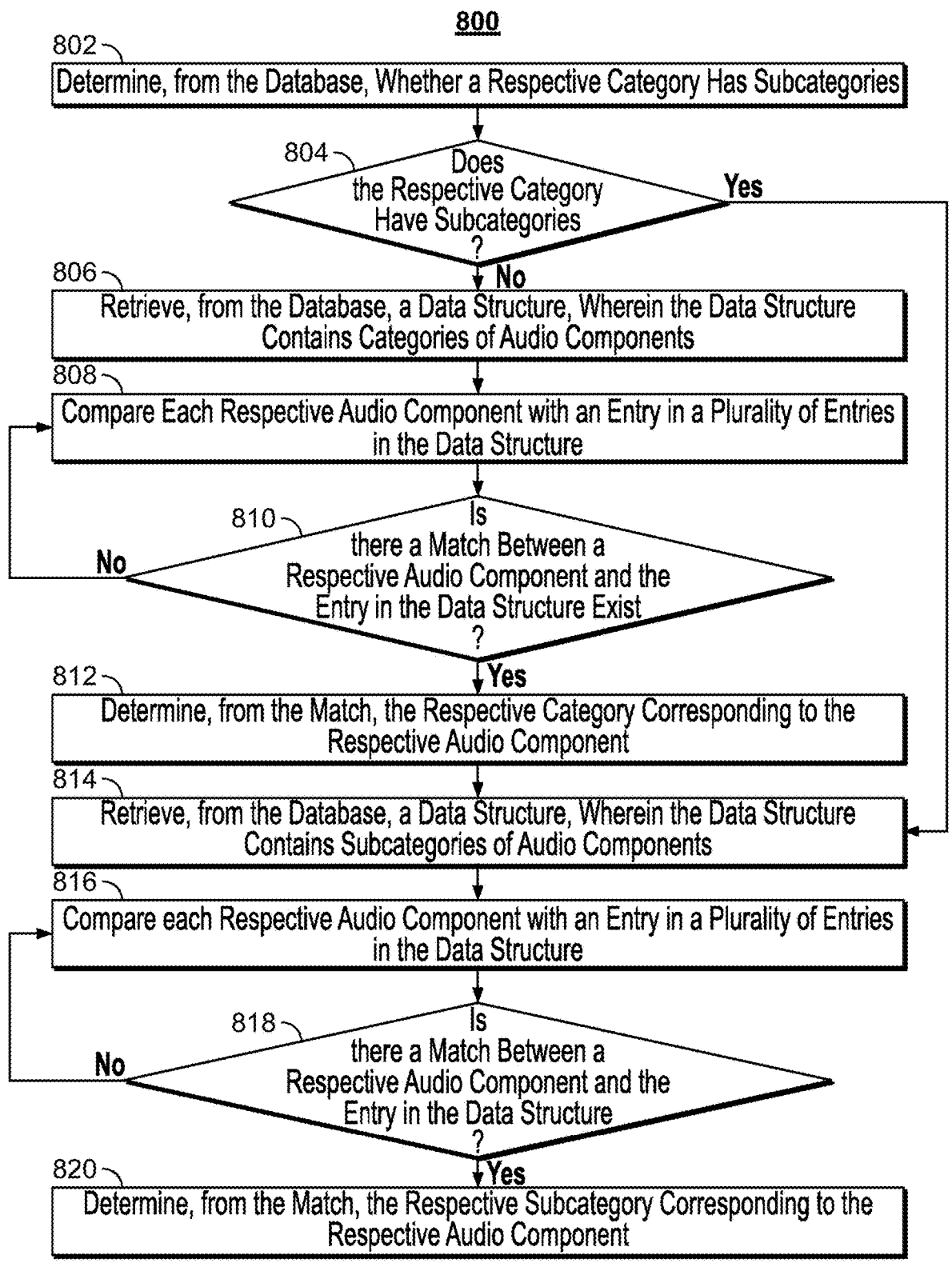
FIG. 8 depicts an illustrative flowchart of a process for determining the category and subcategory corresponding to the respective audio component, in accordance with some embodiments of the disclosure.

FIG. 8 depicts an illustrative flowchart of a process for determining the category and subcategory corresponding to the respective audio component, in accordance with some embodiments of the disclosure. Process 800 begins at 802, where control circuitry 404 determines, from the database, whether a respective category has subcategories. Control circuitry 404 determines, from information in media guidance data source 518, whether an entry in the database contains pointers to subcategory locations.

At 804, control circuitry 404 determines whether the respective category has subcategories. Control circuitry 404 determines whether the respective category has subcategory using the methods described in detail above.

If, at 804, control circuitry 404 determines that "Yes," the respective category has subcategories, then process 804 proceeds to process 814.

If, at 804, control circuitry 404 determines that "No," the respective category does not have subcategories, the process proceeds to 806. At 806, control circuitry 404 retrieves, from the database, a data structure, wherein the data structure contains categories of audio components. For example, control circuitry 404 may retrieve, from media guidance data source 518 over communications network 514, a data structure that contains categories of audio components. At 808, control circuitry 404 compares each respective audio component with an entry in a plurality of entries in the data structure. Control circuitry 404 retrieves entries from the data structure, and compares each respective audio component with an entry using process circuitry 406. At 810, control circuitry 404 determines whether a match between a respective audio component and the entry in the data structure exists. Control circuitry 404 determines whether a match exists using the methods described in detail above. For example, control circuitry 404 may determine that a match exists when the audio component exceeds a threshold percentage of similarity when compared to the entry in the data structure. Control circuitry 404 may retrieve the threshold percentage of similarity from media guidance data source 518 over communications network 514, and may use processing circuitry 406 to determine if the audio component exceeds the threshold percentage of similarity.

If, at 810, control circuitry 404 determines that "No," a match does not exist, then process 810 reverts to process 808.

If, at 810, control circuitry 404 determines that "Yes," a match exists, then process 810 proceeds to process 812. At 812, control circuitry 404 determines, from the match, the respective category corresponding to the respective audio component. Control circuitry 404 determines the respective category corresponding to the respective audio component by retrieving, from information about the entry in media guidance data source 518, the category type.

At 814, control circuitry 404 retrieves, from the database, a data structure, wherein the data structure contains subcategories of audio components. Control circuitry 404 retrieves from media guidance data source 518 the data structure from the database containing subcategories of audio components.

At 816, control circuitry 404 compares each respective audio component with an entry in a plurality of entries in the data structure. For example, control circuitry 404 may compare each respective audio component with entries in the data structure corresponding to a subcategory.

At 818, control circuitry 404 determines whether there is a match between a respective audio component and the entry in the data structure. Control circuitry 404 determines whether a match exists using the methods described in detail above.

If, at 818, control circuitry 404 determines that "No," there is not a match, then process 818 reverts to 816.

If, at 818, control circuitry 404 determines that "Yes," there is a match, then process 818 proceeds to 820. At 820, control circuitry 404 determines, from the match, the respective subcategory corresponding to the respective audio component. Control circuitry 404 determines the respective subcategory using the methods described in detail above.

Figure 9:
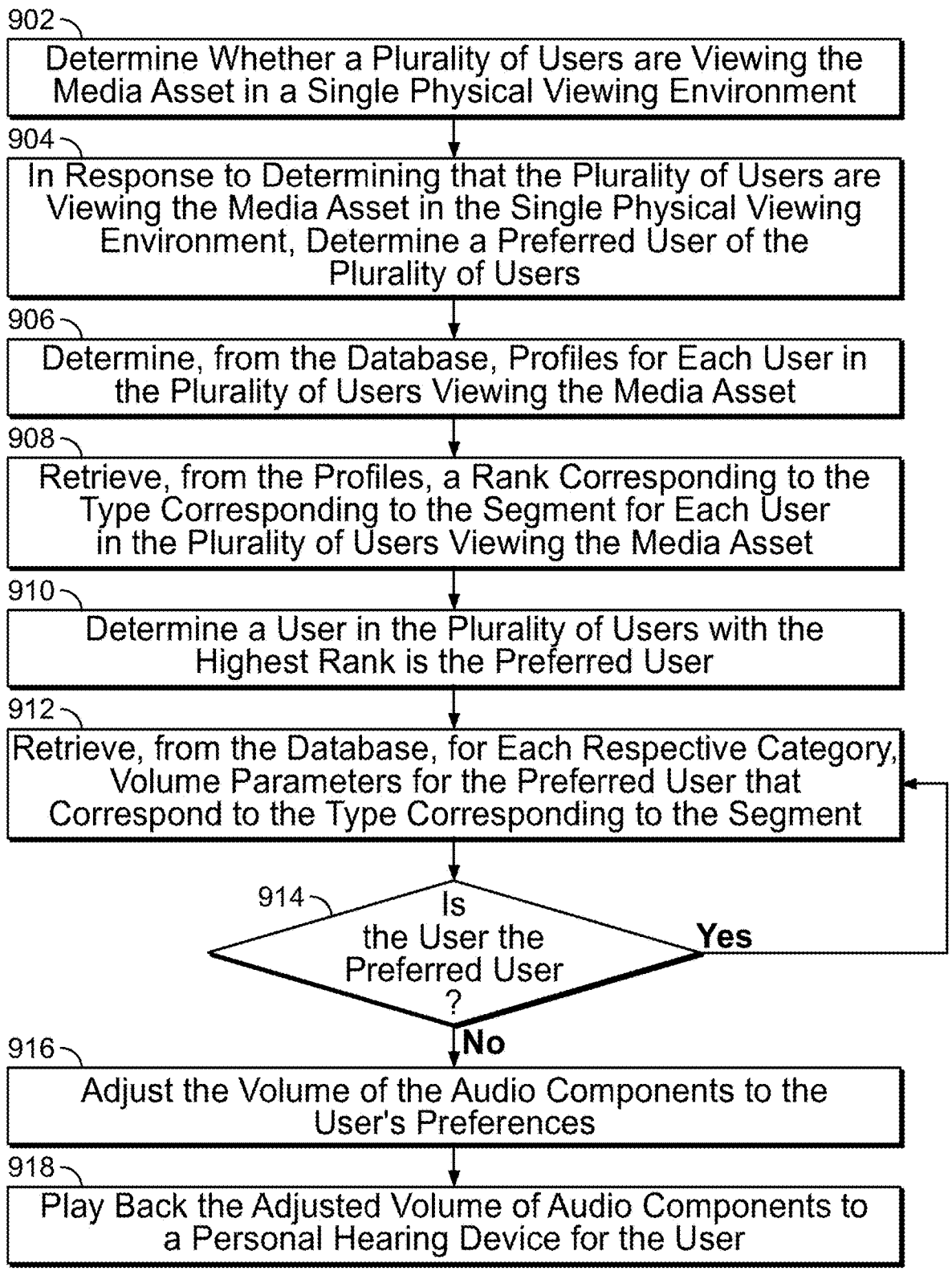
FIG. 9 depicts an illustrative flowchart of a process for determining the preferred user, in accordance with some embodiments of the disclosure.

FIG. 9 depicts an illustrative flowchart of a process for determining the preferred user, in accordance with some embodiments of the disclosure. Process 900 begins at 902, where control circuitry 404 determines whether a plurality of users are viewing the media asset in a single physical viewing environment. Control circuitry 404 uses a sensor that communicates over communications network 514 to determine whether a plurality of users are viewing the media asset in a single physical location. For example, control circuitry 404 may determine whether a plurality of users are viewing the media asset from input from a sensor (e.g., a camera), via communications network 514.

At 904, in response to determining that the plurality of users are viewing the media asset in the single physical viewing environment, control circuitry 404 determines a preferred user of the plurality of users. Control circuitry 404 determines the preferred user using the same methods as described above. For example, control circuitry 404 may determine the preferred user based on the highest ranked user in the type corresponding to the segment. At 906, control circuitry 404 determines, from the database, profiles for each user in the plurality of users viewing the media asset. Control circuitry 404 retrieves user profiles for each user in the plurality of users from media guidance data source 518 over communications network 514. At 908, control circuitry 404 retrieves, from the profiles, a rank corresponding to the segment for each user in the plurality of users viewing the media asset. For example, control circuitry 404 retrieves a rank corresponding to the type of the segment for each user in the plurality of users from the user profiles in media guidance data source 518 over communications network 514. At 910, control circuitry 404 determines a user in the plurality of users with the highest rank is the preferred user. Control circuitry 404 determines the user with the highest rank using the same methods as described above. For example, control circuitry 404 may determine that the user who watches action films 90% of the time (e.g., rank is 90) has the highest rank.

At 912, control circuitry 404 retrieves, from the database, for each respective category, volume parameters for the preferred user that correspond to the type corresponding to the segment. Control circuitry 404 retrieves the volume parameters from information from media guidance data source 518 over communications network 514.

At 914, control circuitry 404 determines if the user is the preferred user. Control circuitry determines if the user is the preferred user by determining, using processing circuitry 406, whether the user has the highest rank for the type of segment in play back.

If, at 914, control circuitry 404 determines that "Yes," the user is the preferred user, then process 914 reverts to process 912.

If, at 914, control circuitry 404 determines that "No," the user is not the preferred user, then process 914 proceeds to 916. At 916, control circuitry 404 adjusts the volume of the audio components to the user's preferences. Control circuitry 404 adjusts the volume of the audio components using the methods described above. At 918, control circuitry 404 plays back the adjusted volume of audio components to a personal hearing device for the user. Control circuitry 404 plays back the adjusted volume of audio components through user computer equipment 504 (e.g., user computer monitor headphones) or wireless user communications device (e.g., Bluetooth wireless headphones).

It should be noted that processes 600-900 or any step thereof could be performed on, or provided by, any of the devices shown in FIGS. 1 and 4-5. For example, any of processes 600-900 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-900 may be incorporated into or combined with one or more steps of any other process or embodiment.

It is contemplated that the steps or descriptions of each of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-9.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A computer-implemented method, comprising:
   determining that a particular scene of a plurality of scenes of a video is being presented for display in a single physical viewing environment to a plurality of users, wherein each user of the plurality of users has a respective profile that stores scene viewing history data of a respective user of the plurality of users;
   retrieving metadata corresponding to the particular scene from a database;
   determining, based on the metadata, a type of the particular scene;
   identifying, based on the type of the particular scene, a preferred user of the plurality of users, wherein the preferred user is associated with a preferred user profile that comprises scene viewing history data indicating the preferred user has a highest affinity for the type of the particular scene among the plurality of users;
   parsing audio components of an audio track of the particular scene, wherein each of the audio components comprise a specific type of sound;
   isolating the audio components from the audio track of the particular scene;
   for each respective portion of a plurality of portions of the particular scene, determining, based on the type of the particular scene and volume parameters stored via the preferred user profile, whether to adjust volume of audio associated with the isolated audio components of each respective portion;
   in response to determining, based on the type of the particular scene and the volume parameters stored via the preferred user profile, to adjust the volume of audio associated with the isolated audio components of at least one respective portion of the particular scene, adjusting the volume of audio associated with the isolated audio components of the at least one respective portion of the particular scene;
   playing the at least one respective portion of the particular scene with the adjusted volume;
   determining a type of a subsequent scene is different from the type of the particular scene;
   identifying an updated preferred user of the plurality of users, wherein the updated preferred user is associated with an updated preferred user profile that comprises scene viewing history data indicating the updated preferred user has a highest affinity for the type of the subsequent scene among the plurality of users; and
   playing the subsequent scene of the video with volume adjusted according to updated volume parameters stored via the updated preferred user profile.

2. The method of claim 1, further comprising:
   determining a respective category corresponding to the at least one respective portion of the particular scene;
   wherein determining, for the at least one respective portion of the plurality of portions of the particular scene, based on the type of the particular scene, whether to adjust the volume of audio associated with the at least one respective portion is based at least in part on the category of the at least one respective portion.

3. The method of claim 1, further comprising:
   determining, based on the type of the particular scene and for each respective portion of the plurality of portions of the particular scene, whether to adjust volume of audio associated with each respective portion;
   adjusting the volume of audio for each respective portion of the plurality of portions for which it is determined that adjustment is to be performed; and
   declining to adjust the volume of audio for each respective portion of the plurality of portions for which it is determined that adjustment is not to be performed.

4. The method of claim 3, further comprising:
   determining a respective category corresponding to each respective portion of the plurality of portions of the particular scene;
   determining, based on the type of the particular scene, whether to adjust volume of audio associated with each respective portion further comprises:

retrieving, from a database, for each respective category, volume parameters for the user profile that correspond to the type; and determining, for each respective category, whether audio of the corresponding portion is set to a volume that is within the volume parameters.

5. The method of claim 4, wherein determining a respective category corresponding to each respective portion of the plurality of portions comprises:

retrieving, from the database, a data structure, wherein the data structure comprises a plurality of categories;

comparing each respective portion with one or more categories in the data structure;

determining, from the comparison, whether a match between a respective portion and the one or more categories in the data structure; and in response to determining that the match exists, determining, from the match, the respective category corresponding to the respective portion.

6. The method of claim 1, further comprising:

generating for display an option regarding whether to perform adjustment of audio of the at least one respective portion of the particular scene based on preferences of the user profile; and performing the adjusting of the volume of audio associated with the at least one respective portion of the particular scene further based on receiving selection of the option.

7. The method of claim 1, wherein:

each scene of the plurality of scenes of the video corresponds to a respective type; and the method further comprises adjusting volume of audio for at least one portion of each of the plurality of scenes based on the respective type of each scene of the plurality of scenes.

8. The method of claim 7, wherein the plurality of scenes correspond to a plurality of genres, respectively.

9. The method of claim 1, further comprising:

playing the adjusted volume of audio components at a personal hearing device of the preferred user.

10. A computer-implemented system, comprising:

input/output circuitry;

control circuitry configured to:

determine that a particular scene of a plurality of scenes of a video is being presented for display in a single physical viewing environment to a plurality of users, wherein each user of the plurality of users has a respective profile that stores scene viewing history data of a respective user of the plurality of users;

retrieve metadata corresponding to the particular scene from a database;

determine, based on the metadata, a type of the particular scene;

rein the preferred user is associated with a preferred user profile that comprises scene viewing history data indicating the preferred user has a highest affinity for the type of the particular scene among the plurality of users;

parsing audio components of an audio track of the particular scene, wherein each of the audio components comprise a specific type of sound;

isolating the audio components from the audio track of the particular scene;

for each respective portion of a plurality of portions of the particular scene, determine, based on the type of the particular scene and volume parameters stored via the preferred user profile, whether to adjust volume of audio associated with the isolated audio components of each respective portion; and in response to determining, based on the type of the particular scene and the volume parameters stored via the preferred user profile, to adjust the volume of audio associated with the isolated audio components of at least one respective portion of the particular scene, adjust the volume of audio associated with the isolated audio components of the at least one respective portion of the particular scene;

the input/output circuitry is configured to:

play the at least one respective portion of the particular scene with the adjusted volume;

wherein the control circuitry is further configured to:

determine a type of a subsequent scene is different from the type of the particular scene;

identify an updated preferred user of the plurality of users, wherein the updated preferred user is associated with an updated preferred user profile that comprises scene viewing history data indicating the updated preferred user has a highest affinity for the type of the subsequent scene among the plurality of users; and wherein the input/output circuitry is further configured to:

play the subsequent scene of the video with volume adjusted according to updated volume parameters stored via the updated preferred user profile.

11. The system of claim 10, wherein the control circuitry is further configured to:

determine a respective category corresponding to the at least one respective portion of the particular scene;

wherein determining, for the at least one respective portion of the plurality of portions of the particular scene, based on the type of the particular scene, whether to adjust the volume of audio associated with the at least one respective portion is based at least in part on the category of the at least one respective portion.

12. The system of claim 10, wherein the control circuitry is further configured to:

determine, based on the type of the particular scene and for each respective portion of the plurality of portions of the particular scene, whether to adjust volume of audio associated with each respective portion;

adjust the volume of audio for each respective portion of the plurality of portions for which it is determined that adjustment is to be performed; and decline to adjust the volume of audio for each respective portion of the plurality of portions for which it is determined that adjustment is not to be performed.

13. The system of claim 12, wherein the control circuitry is further configured to:

determine a respective category corresponding to each respective portion of the plurality of portions of the particular scene;

determine, based on the type of the particular scene, whether to adjust volume of audio associated with each respective portion by:

retrieving, from a database, for each respective category, volume parameters for the user profile that correspond to the type; and determining, for each respective category, whether audio of the corresponding portion is set to a volume that is within the volume parameters.

14. The system of claim 13, wherein the control circuitry is configured to determine a respective category corresponding to each respective portion of the plurality of portions by:

retrieving, from the database, a data structure, wherein the data structure comprises a plurality of categories;

comparing each respective portion with one or more categories in the data structure;

determining, from the comparison, whether a match between a respective portion and the one or more categories in the data structure; and in response to determining that the match exists, determining, from the match, the respective category corresponding to the respective portion.

15. The system of claim 10, wherein the control circuitry is further configured to:

generate for display an option regarding whether to perform adjustment of audio of the at least one respective portion of the particular scene based on preferences of the user profile; and perform the adjusting of the volume of audio associated with the at least one respective portion of the particular scene further based on receiving selection of the option.

16. The system of claim 10, wherein:

each scene of the plurality of scenes of the video corresponds to a respective type; and the control circuitry is configured to adjust volume of audio for at least one portion of each of the plurality of scenes based on the respective type of each scene of the plurality of scenes.

17. The system of claim 16, wherein the plurality of scenes correspond to a plurality of genres, respectively.

18. The system of claim 10, wherein the control circuitry is further configured to:

cause the adjusted volume of audio components to be played at a personal hearing device of the preferred user.

19. The computer-implemented method of claim 1, wherein:

the determining the type of the subsequent scene is different from the type of the particular scene further comprises retrieving metadata corresponding to the subsequent scene of the video; and the determining is based on the retrieved metadata.

20. The computer-implemented system of claim 10, wherein the control circuitry configured to determine the type of the subsequent scene is different from the type of the particular scene is further configured to retrieve metadata corresponding to a subsequent scene of the video, wherein the determining is based on the retrieved metadata.

* * * * *